United States Patent Office 3,382,722
Patented May 14, 1968

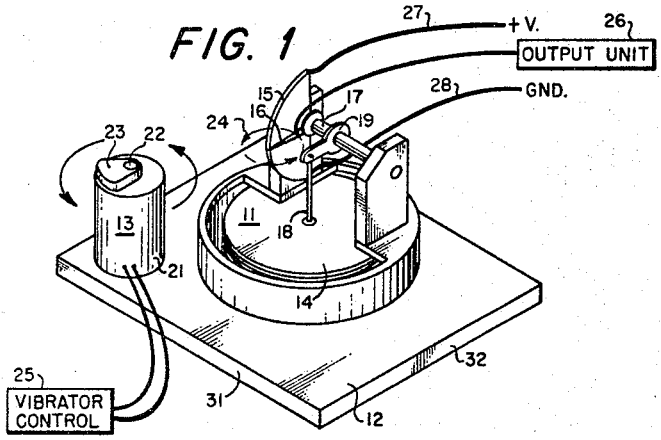
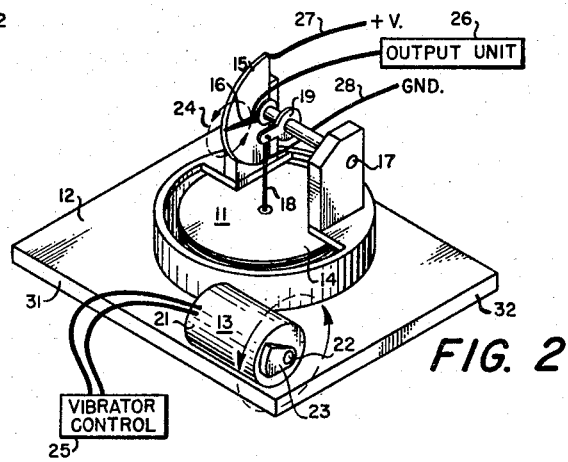
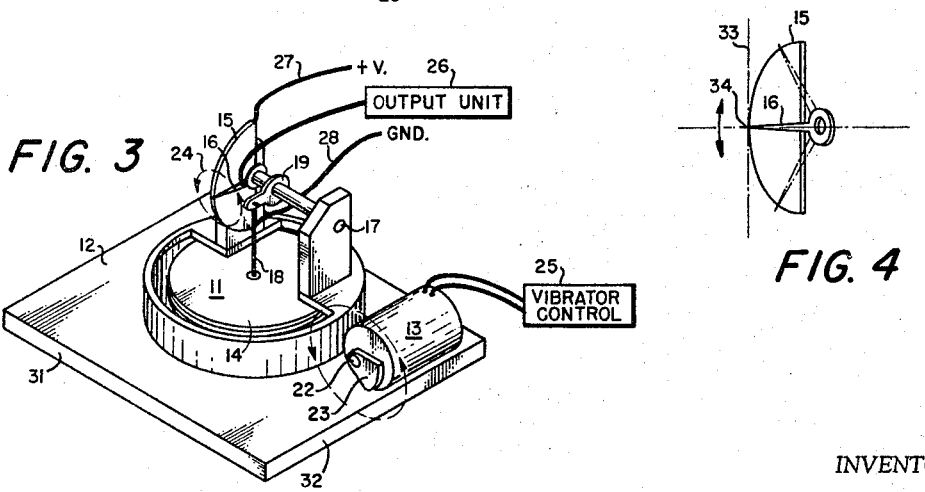
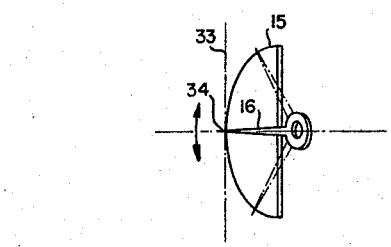

3,382,722
INDICATING INSTRUMENT HAVING VIBRATOR FOR REMOVING EFFECTS OF STATIC FRICTION
Richard B. Bridge, Greenbelt, Md., and Thomas E. Marshall III, Sterling, Va., assignors to the United States of America as represented by the Secretary of the Navy
Filed Mar. 31, 1966, Ser. No. 540,151
9 Claims. (Cl. 73—432)

ABSTRACT OF THE DISCLOSURE

A condition responsive measuring instrument having a motor-driven rotating eccentric mass to produce vibrations for the purpose of overcoming the effects of hysteresis and static friction upon the instrument's pointer or wiper arm on a potentiometer. The relationship of the axis of rotation of the vibrator relative to the plane of movement of the pointer and to the movement of the sensing element may be controlled to select the effects desired to be produced upon those structures. The vibrator may be periodically controlled to produce vibrations which continuously vary in amplitude and frequency from zero to predetermined values and then to zero.

---

The invention described herein may be manufactured and used by or for the Government of the United States of America for governmental purposes without the payment of any royalties thereon or therefor.

The invention relates to an improved electromechanical indicating device having means for eliminating the effects of hysteresis and static friction and more particularly to an improved indicating device wherein a vibration is periodically applied to the movable element thereof to eliminate static friction that inhibits the free motion of the movable element so that the movable element does not adhere to any position.

Over the years there have been serious problems with indicating instruments such as those used in moving vehicles, such as aircraft, ships, or space vehicles, and fixed or remote environmental telemetering equipment wherever information concerning a desired condition is intermittently visually reviewed, recorded or transmitted. In instruments having transducers or sensing elements attached to a movable element, such as a pointer or wiper arm, associated with a resistive element, such as a slide wire or coil of a potentiometer, the usual problem is that static friction causes the movable element to adhere to a given position and causes errors in the indicated output. Where the movable element is pivoted, another problem is presented due to pivot friction. These problems are particularly serious where there is relatively little natural environmental vibration for the instrument. Due to the static friction, a hysteresis problem is encountered wherein different values are produced as output information for the same value of input, depending upon the direction in which the movable element must travel.

The general purpose of this invention is to provide an improved indicating device which is virtually free of hysteresis and static friction and which embraces all the advantages of similar devices while possessing none of their disadvantages. To attain this, the present invention contemplates an electro-mechanical indicating instrument, such as a barometric unit, having a vibrator comprising a motor-driven eccentric mass for imparting a vibration to the movable element of the instrument. The vibrator is energized periodically by means of a vibrator control device to apply a vibration of continuously increasing amplitude and frequency for a predetermined time and then to apply a vibration of continuously decreasing amplitude and frequency until the movable element returns to its normal position. In a first embodiment, the axis of rotation of the eccentric mass is parallel to the plane of movement of said movable element, perpendicular to the axis of rotation of said movable element, and parallel to a tangent to the midpoint of the resistive element. In this embodiment, the vibration varies the force exerted by the movable element upon the resistive element with which it is in intimate contact. This variation in force causes a periodic reduction in the tangential force which ordinarily prevents the movable element from attaining the proper position. In a second embodiment, the axis of rotation of the eccentric mass is perpendicular to the plane of movement of the movable element, parallel to the axis of rotation of the movable element, and perpendicular to a tangent to the midpoint of the movable element in its plane of movement. In that embodiment, the movable element moves in both directions on each side of the proper position while the motor is energized. As the motor slows, the movable element comes to rest at the proper position. This action removes the hysteresis effect and makes the movable element insensitive to the direction from which the position was reached. In a third embodiment, the axis of rotation of the eccentric is parallel to the plane of movement of the movable element, perpendicular to the axis of rotation of the movable element, and perpendicular to a tangent to the midpoint of the resistive element. In this embodiment, the vibrations vary the movable element in both directions along the resistive element, and also vary the force exerted by the movable element upon the resistive element. The third embodiment therefore substantially combines the functions of the first and second embodiments. The movable element is usually pivoted, so that the vibration also greatly reduces the pivot friction in each of the embodiments.

An object of the present invention is to provide an improved indicating instrument wherein the movable element of the instrument is virtually free of the effects of static friction.

Another object of the present invention is to provide a simple, inexpensive and lightweight indicating instrument wherein the movable element is periodically vibrated in a predetermined manner.

A further object is the provision of an indicating instrument having means for vibrating the movable element and wherein said means is easily mounted on the instrument housing.

Still another object of this invention is to provide an improved technique for periodically subjecting an indicating instrument to acceleration forces, either perpendicular, parallel, or both perpendicular and parallel to the plane of movement of its movable element, which are adequate to free the movable element from the effects of static friction and hysteresis without impairing the accuracy of the indications provided by the instrument.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates a first embodiment of this invention with the vibrator vertically mounted on the instrument casing;

FIG. 2 illustrates a second embodiment wherein the vibrator horizontally mounted along an edge of the instrument casing and perpendicular to the plane of movement of the movable element;

FIG. 3 illustrates a third embodiment wherein the vibrator is horizontally mounted along another edge of the instrument casing and parallel to the plane of movement of the movable element; and FIG. 4 is a diagrammatic representation of the relationship between the resistive element and the movable element.

Referring now to the drawings, there is shown in FIG. 1 a barometric instrument 11 mounted on a casing base 12 and upon which is vertically mounted a vibrator 13. The barometer 11 has a bellows or transducer 14 for sensing and converting pressure to a mechanical movement. Barometer 11 includes a potentiometer having a curved resistive element 15 in intimate mechanical and electrical contact with an electrically conductive wiper or movable element 16 fixed to a shaft 17 which is perpendicular to the plane of movement of movable element 16. The plane of movement of movable element 16 is the plane within which movable element 16 travels in response to movements of transducer 14. Transducer 14 is coupled to shaft 17 by means of rod 18 and arm 19 so that the vertical mechanical movement of transducer 14 is converted to a rotational movement of shaft 17. Vibrator 13 comprises, as shown in FIG. 1, a motor 21 for driving a shaft 22 having an eccentric mass 23 mounted to shaft 22 so that the plane of rotation of eccentric mass 23 is perpendicular to shaft 22.

A vibrator control unit 25 is connected to vibrator 13 to energize motor 21 in accordance with a predetermined program. Any suitable control means may be utilized which is capable of periodically energizing motor 21 and then deenergizing the motor after a predetermined time. The time between energization and deenergization of motor 21 should be sufficient to allow motor 21 to reach full speed. Where the instrument is stationed at a remote location, receiver circuitry is provided at the input to the vibrator control unit 25 for receiving remote control signals.

In each of the embodiments of FIGS. 1–3 the output signal, which is proportional to the pressure sensed by transducer 14, is coupled to an output unit 26. Output unit 26 may be a recorder, analog-to-digital converter or a transmitting unit if the instrument is stationed at a remote location and it is desired to transmit the sensed information. Regardless of the type of output device employed, the output readings are utilized only during the time between vibrations preferably, immediately following a vibration cycle.

Resistive element 15 is energized, as shown in FIGS. 1–3, by coupling resistive element 15 between a positive voltage source and ground by means of leads 27 and 28, repsectively. However, the potentiometer may be operated in any other suitable manner. For example, the potentiometer may obviously be connected to give resistance output readings rather than voltage output readings.

In the embodiment shown in FIG. 1, vibrator 13 is mounted so that the axis of rotation of the eccentric 23 is perpendicular to the axis of rotation of movable element 16, parallel to the plane of movement of movable element 16, and substantially parallel to a tangent to the midpoint of curved resistive element 15 in the plane of movement of movable element 16. In this embodiment, the vibrations vary the force exerted by movable element 16 against resistive element 15.

In a second embodiment, illustrated in FIG. 2, vibrator 13 is positioned and mounted horizontally and parallel to edge 31 of casing base 12 so that the axis of rotation of eccentric 23 is parallel to the axis of rotation of movable element 16, perpendicular to the plane of movement of movable element 16 and perpendicular to a tangent to the midpoint of resistive element 15 in the plane of movement of movable element 16. In this embodiment, the vibrational forces are transmitted by base 12 and the barometer components to move element 16 in both directions about the proper position during the time the motor is energized.

FIG. 3 illustrates a third embodiment of this invention wherein vibrator 13 is positoned and mounted horizontally and parallel to edge 32 of casing base 12 so that the axis of rotation of eccentric 23 is perpendicular to the axis of rotation of movable element 16, parallel to the plane of movement of movable element 16, and perpendicular to a tangent to the midpoint of curved resistive element 15 in the plane of movement of movable element 16. In this embodiment vibrational forces are transmitted by means of casing base 12 and the barometer components to move element 16 in both directions along resistive element 15 and also to vary the force exerted by the movable element 16 upon resistive element 15. In effect, the embodiment of FIG. 3 substantially combines the functions of the embodiments of FIGS. 1 and 2.

FIG. 4 is a diagrammatic representation of the relationship between movable element 16 and resistive element 15. A tangent 33 is drawn to midpoint 34 to illustrate the orientation of the various components. Obviously, the resistive element 15 need not be fixed in the position described and illustrated, i.e., so that tangent 33 is perpendicular to base 12, but may be positioned suitably with respect to shaft 17.

In operation of the several embodiments shown in FIGS. 1, 2 and 3, motor 21 is periodically energized by vibrator 25 at a time $t_0$ for a predetermined time to produce vibrations of continuously increasing amplitude and frequency. When the maximum amplitude is reached motor 21 is then deenergized at a time $t_1$ so that the amplitude and frequency of vibration are continuously decreased until movable element 16 has returned to its proper position at a time $t_2$ In practice, motor 21 is first energized for a period of approximately 4 to 10 seconds, depending on the time needed to reach maximum speed. During the energizing period, eccentric 23 causes movable element 16 to vibrate in its plane of movement with a frequency and amplitude beginning at zero and increasing to a maximum frequency and amplitude when the maximum speed of the motor is reached. The vibration remains at that maximum until the motor is deenergized at time $t_1$ when the frequency and amplitude begin decreasing to zero at time $t_2$ when movable element 16 reaches its normal position at time $t_2$ this vibratory action eliminates hysteresis effects and makes movable element 16 insensitive to the direction from which the position was reached.

In the embodiment of FIG. 1, the vibrations vary as shown by dotted line 24 to vary the force exerted by movable element 16 against resistive element 15. This variation of pressure causes a periodic reduction in the tangential force which ordinarily prevents movable element 16 from attaining its proper position. When the amplitude of vibration is increased so that movable element 16 is physically separated from resistive element 15, both normal and tangential forces are zero so that the movable element is free to coincide with its normal position. The vibration in this embodiment also moves shaft 17 of the movable element parallel to its axis of rotation thereby greatly reducing pivot friction.

In the embodiment of FIG. 2, the vibrations vary as shown by dotted line 24 and cause movable element 16 to move in both directions on each side of the normal position while motor 21 is running. This movement diminishes as the motor slows and allows movable element 16 to rest at the normal position. The action removes the hysteresis effect and allows movable element 16 to be insensitive to the direction from which the position was reached.

In the embodiment of FIG. 3, the vibrations cause element 16 to move substantially as defined by dotted path 24 so that element 16 moves in both directions about the normal position while varying the force which movable element 16 exerts on resistive element 15. By means of the embodiment of FIG. 3, the cumulative effects of the embodiments of FIGS. 1 and 2 are obtained.

In all embodiments herein set forth, the vibrational forces effectively clean the contact area between the resistive element and the movable element so that a position contact can be made between the elements. A low resistance and low noise level contact is thereby produced which is desirable for obtaining accurate and repeatable information from instruments, such as barometers at remote weather stations, which operate intermittently or which are stored indefinitely.

It is to be understood that the vibration principles set forth herein are not limited to instruments such as the barometric unit described and illustrated but may be advantageously utilized with respect to most meter movements, especially where the effects of pivot friction are to be eliminated.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A device for producing an indication proportional to a condition comprising:
   means for sensing and converting said condition into a mechanical movement,
   a movable element coupled to said means for sensing and converting and moving in a defined plane of movement in response to said means for sensing and converting for providing a signal proportional to said condition,
   resistive means positioned in intimate contact with said movable element wherein the relative movement of said movable element along said resistive means provides a measure of said condition, and
   vibrating means mechanically coupled to said movable element for periodically vibrating said movable element from a static position into a vibration of continuously increasing amplitude and frequency for a predetermined time and then continuously decreasing the frequency and amplitude of vibration until a proper position indicative of said condition is reached.

2. An indicating device as set forth in claim 1 wherein said vibrating means comprises:
   a motor having a shaft,
   eccentric means mounted on said shaft, wherein said shaft comprises the axis of rotation of said eccentric means,
   means for controlling said motor in accordance with a predetermined program, and
   means mechanically coupled between said vibrating means and said movable element for transmitting said vibration to said movable element.

3. An indicating device as set forth in claim 2, wherein said means coupled between said vibrating means and said movable element comprises a housing base for supporting said indicating device.

4. An indicating device as set forth in claim 2, wherein the axis of rotation of said eccentric means is perpendicular to the axis of rotation of said movable element, parallel to the plane of movement of said movable element, and parallel to a tangent at the midpoint of said resistive element in the plane of movement of said movable element.

5. An indicating device as set forth in claim 2, wherein the axis of rotation of said eccentric means is parallel to the axis of rotation of said movable element and perpendicular to the plane of movement of said movable element.

6. An indicating device as set forth in claim 2, wherein the axis of rotation of said eccentric is perpendicular to the axis of rotation of the movable element, parallel to the plane of movement of said movable element, and perpendicular to a tangent to the midpoint of said resistive element in the plane of movement of said movable element.

7. An indicating device for producing a signal proportional to an environmental condition comprising:
   means for receiving a signal proportional to said environmental condition,
   a movable element coupled to said signal receiving means for moving in a defined plane of movement and having a shaft for pivoting said movable element wherein said shaft is responsive to said signal receiving means,
   resistive means fixedly positioned in mechanical and electrical contact with said movable element, wherein the relative position of said movable element along said resistive means provides a measure of said condition,
   vibrating means mechanically coupled to said movable element and including an eccentric means mounted upon a shaft for rotation about an axis,
   said vibrating means being mounted with the axis of rotation of said eccentric means perpendicular to the axis of rotation of said movable element, parallel to the plane of movement of said movable element, and parallel to a tangent to the midpoint of said resistive element in the plane of movement of said movable element.

8. An indicating device for producing a signal proportional to an environmental condition comprising:
   means for receiving a signal proportional to said environmental condition,
   a movable element coupled to said signal receiving means for moving in a defined plane of movement and having a shaft for pivoting said movable element wherein said shaft is responsive to said signal receiving means,
   resistive means fixedly positioned in mechanical and electrical contact with said movable element, wherein the relative position of said movable element along said resistive means provides a measure of said condition,
   vibrating means mechanically coupled to said movable element and including an eccentric means mounted upon a shaft for rotation about an axis,
   said vibrating means being mounted with the axis of rotation of said eccentric means parallel to the axis of rotation of said movable element and perpendicular to the plane of movement of said movable element.

9. An indicating device for producing a signal proportional to an environmental condition comprising:
   means for receiving a signal proportional to said environmental condition,
   a movable element coupled to said signal receiving means for moving in a defined plane of movement and having a shaft for pivoting said movable element wherein the shaft is responsive to said signal receiving means,
   resistive means fixedly positioned in mechanical and electrical contact with said movable element, wherein the relative position of said movable element along said resistive means provides a measure of said condition, vibrating means mechanically coupled to said movable element and including an eccentric means mounted upon a shaft for rotation about an axis, said vibrating means being mounted with the axis of rotation of said eccentric means perpendicular to the axis of rotation of the movable element, parallel to the plane of movement of said movable element, and perpendicular to a tangent to the midpoint of said resistive element in the plane of movement of said movable element.

References Cited

UNITED STATES PATENTS

| 2,396,383 | 3/1946 | Moore | 73—432 XR |
|---|---|---|---|
| 2,956,251 | 10/1960 | Goeppinger | 73—390 |
| 3,062,057 | 11/1962 | Glaser | 73—432 |

FOREIGN PATENTS 447,809   5/1936   England.

DAVID SCHONBERG, *Primary Examiner.*

D. E. CORR, *Assistant Examiner.*